Mit# United States Patent
La Barge et al.

[15] 3,674,858
[45] July 4, 1972

[54] PREPARATION OF BENZOYL PEROXIDE

[72] Inventors: Robert G. La Barge; Gary L. Johnson, both of Midland, Mich.

[73] Assignee: The Dow Chemical Company, Midland, Mich.

[22] Filed: Oct. 30, 1968

[21] Appl. No.: 771,980

[52] U.S. Cl. .......................................................... 260/610 D
[51] Int. Cl. ........................................................... C07c 73/02
[58] Field of Search ................................... 260/610 D, 610 A

[56] References Cited

UNITED STATES PATENTS 2,504,436   4/1950   McCourbrey et al. .............. 260/610 D
3,397,245   8/1968   Appell .............................. 260/610 D

OTHER PUBLICATIONS

McCutcheon " Synthetic Detergents," page 273 (1954)
Hawkins, " Organic Peroxide" pp. 300– 303 (1961)
Armours Co., " Armour Ethoxylated Chemicals, pp. 1– 2, Surfactant Digest (1961)

*Primary Examiner*—Bernard Helfin
*Assistant Examiner*—W. B. Lone
*Attorney*—Griswold and Burdick and C. E. Rehberg

[57]            ABSTRACT

Benzoyl peroxide is produced by reacting benzoic anhydride with an alkali metal perborate in an aqueous solution.

7 Claims, No Drawings

PREPARATION OF BENZOYL PEROXIDE

BACKGROUND OF THE INVENTION

It is known that benzoyl peroxide may be prepared by the interaction of benzoyl chloride in a cooled solution of sodium peroxide.

Leblon et al. in U.S. Pat. No. 3,109,706 teach the preparation of sodium perborate by the reaction between sodium metaborate and hydrogen peroxide.

SUMMARY OF THE INVENTION

Benzoic anhydride is oxidized to benzoyl peroxide by reaction with an aqueous solution of an alkali metal perborate.

The preferred procedure of the invention involves stirring an aqueous suspension of benzoic anhydride dispersed with a surfactant and adding an equal molar amount of sodium perborate. The sodium perborate may be added directly or it may be produced in situ from hydrogen peroxide and sodium borate. By maintaining the temperature of the reaction mixture at 55° to 60° C. for an hour or more, 80 to 98 percent yields of benzoyl peroxide are obtained. The two moles of benzoic acid produced for every mole of benzoyl peroxide formed by the reaction, may be recovered and recycled.

The borates used in the process of the present invention are the salts of boric acid $H_3BO_3$. Since no salts of the composition $Na_3BO_3$ are known, borates of other degrees of hydration are equivalent. Thus, metaborate ($BO_2^{-1}$), tetraborate ($B_4O_7^{-2}$), pyroborate and others may be suitably used in the process of the invention.

When the perborate is made in situ by the reaction between an alkali metal borate salt and hydrogen peroxide, the borate may be obtained from sodium borate, potassium borate, ammonium borate, rubidium borate, cesium borate or the like. Compounds containing borate which is readily soluble are preferred.

To form the perborate from the alkali metal borate, hydrogen peroxide is added to the aqueous solution of the alkali metal borate. An equal molar amount of hydrogen peroxide or more is preferred. The source of the hydrogen peroxide may suitably be pure hydrogen peroxide, or its aqueous solution. An aqueous solution containing about 30 percent hydrogen peroxide is preferred.

The alkali metal perborate used in the process of the present invention may suitably be ammonium perborate, sodium perborate, potassium perborate, rubidium perborate, cesium perborate or the like. Sodium perborate and potassium perborate are preferred.

The molar ratio of the perborate to the benzoic anhydride may vary widely, e.g., from 0.1 to 40. Because the stoichiometry of the reaction requires 1 mole of perborate for 2 moles of benzoic anhydride, mole ratios of 0.5 or greater are preferred.

The pH of the reaction is not a critical factor, for varying amounts of benzoyl peroxide are formed under neutral, basic and acidic conditions. Optimum results are usually obtained at a pH of about 7 to 10. During the course of the reaction, the pH drops somewhat. If a constant pH is maintained during the course of the reaction, however, yields of benzoyl peroxide may diminish significantly.

The presence of a surfactant is required to achieve intimate contact between the organic and the aqueous phase of the reaction mixture. The nature of the surfactant is not of primary importance so long as it functions as a dispersing agent for the benzoic anhydride. Anionic surfactants such as Gafac RE 610 (a free acid of a complex phosphate ester), cationic surfactants such as EP-2642-14-II (a difatty alkyl dimethyl ammonium chloride from which the normal isopropanol and water solvents have been vacuum stripped) and non-ionic surfactants such as Alfonic 1012-60 (derived from dodecanol-1 and containing 60 percent ethylene oxide) may be used, with anionic surfactants being preferred.

The amount of surfactant is not critical so long as an effective amount is used. Usually about 1.5 to 2 percent by weight of the surfactant, based on the anhydride, is sufficient.

The temperature of the reaction may suitably range form 30° to 80° C. or more, but the best results are usually obtained between 40° and 65° C. As the temperature is lowered from this optimum reaction condition, the yield decreases significantly. Higher temperatures may result in a loss of some of the peroxide values and deterioration of the properties of the alkali metal perborate.

At the optimum temperature, the major portion of the reaction is completed is approximately 10 to 15 minutes, but for greater conversion, 60 to 90 minutes should be allowed. If a reaction time of 90 minutes or more is used, the reaction goes almost to 100 percent completion.

Not only the alkali borate but also the alkali metal perborate may be combined with hydrogen peroxide in the process of this invention.

SPECIFIC EMBODIMENTS

EXAMPLE 1

To a 2 liter beaker, 1,000 ml. of water, 1.0 g. (4.4 mm.) of benzoic anhydride fused with 40 mg. of Gafac RE 610 (free acid of a complex phosphate ester surfactant), 450 mg. of a 30 percent aqueous solution of hydrogen peroxide, and 520 mg. (4.6 mm.) of sodium tetraborate were added. The solution was maintained at 55° C. and stirred for 15 minutes. The reaction mixture was then cooled to room temperature and filtered. Filtration afforded 480 mg. of benzoyl peroxide for an 86 percent yield based on the anhydride starting material.

EXAMPLE 2

1.08 Grams (4.8 mm.) of molten benzoic anhydride was fused with 20 mg. of Gafac RE 610 surfactant. The mixture was dispersed in 1 liter of water at 60° C. To the aqueous suspension, 500 mg. (5.1 mm.) of sodium perborate monohydrate was added. Stirring was continued for 90 minutes with the temperature maintained at 60° ± 2° C. The solution was cooled to room temperature, filtered through a fine fritted glass filter and air dried. A total of 565 mg. of benzoyl peroxide was isolated. This yield of 98 percent based on the starting anhydride.

In the same manner as the above three examples, benzoyl peroxide is obtained by reacting benzoic anhydride with other alkali metal perborates.

We claim:

1. The process for making benzoyl peroxide comprising reacting by contacting benzoic anhydride in the presence of a surfactant which functions as a dispersing agent for the benzoic anhydride, with an aqueous solution of an alkali metal perborate at 30° C. to about 80° C.

2. The process defined in claim 1 wherein the alkali metal perborate is made in situ by the reaction between an alkali metal borate and hydrogen peroxide.

3. The process defined in claim 1 wherein the benzoic anhydride is fused with the surfactant.

4. The process defined in claim 1 wherein the molar ratio of the perborate to the benzoic anhydride ranges from 0.1 to 40.

5. The process defined in claim 1 wherein the temperature is 40° to 65° C.

6. The process defined in claim 1 wherein the pH of the solution is 7 to 10.

7. The process of claim 1 wherein the alkali metal is sodium or potassium.

* * * * *